(12) United States Patent
Silverbrook (10) Patent No.: US 6,970,186 B1
(45) Date of Patent: *Nov. 29, 2005

(54) CAMERA EXCHANGE SYSTEM AND METHOD

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 847 days.

This patent is subject to a terminal disclaimer.

(21) Appl. No.: 09/662,617

(22) Filed: Sep. 15, 2000

(51) Int. Cl.⁷ .......................................... H04N 5/225
(52) U.S. Cl. ...................... 348/207.2; 347/2; 347/85
(58) Field of Search ........................ 347/2; 348/207.2

(56) References Cited

U.S. PATENT DOCUMENTS

| | | | |
|---|---|---|---|
| 5,418,585 A | | 5/1995 | Petruchik et al. |
| 5,517,265 A | * | 5/1996 | Zander et al. ............... 396/6 |
| 6,070,013 A | * | 5/2000 | Cosgrove et al. ............... 396/6 |
| 6,088,530 A | | 7/2000 | Rydelek et al. |
| 6,238,033 B1 | * | 5/2001 | Silverbrook ................... 347/2 |

FOREIGN PATENT DOCUMENTS

WO        WO 97/006958 A1     2/1997

OTHER PUBLICATIONS

"Polaroid Introduces New Single-Use Instant Camera", Newswire, Sep. 16, 1998.*

* cited by examiner

Primary Examiner—Richard Chilcot
Assistant Examiner—James A Kramer (57) ABSTRACT

A camera exchange system includes a plurality of one-time use, digital cameras. Each camera includes an authentication device. The system includes at least one refurbishing station for refurbishing used, returned cameras by replenishing consumables of each of said returned cameras. The authentication device of each camera authenticates whether or not the refurbishing station is authorised to effect refurbishing of the camera.

15 Claims, 9 Drawing Sheets

CAMERA EXCHANGE SYSTEM AND METHOD

FIELD OF THE INVENTION

This invention relates to a recyclable, one-time use, print on demand, digital camera. More particularly, the invention relates to a camera exchange system and to a method of exchanging cameras of the type described.

BACKGROUND TO THE INVENTION

One-time use cameras, making use of conventional photographic film, are becoming increasingly popular. A customer purchases the camera, exposes the film in the camera and returns the entire camera to a processing centre to have the exposed film processed. As far as the customer is concerned, the camera is, in that sense, a disposable camera. At the processing centre, the film is removed from the camera in darkroom conditions and is processed. The camera casing and remaining parts are, where possible, recycled.

We have also proposed the use of printing technology in a digital camera for more upmarket cameras and, in this regard, reference is made to our co-pending U.S. application Ser. No. 09/113,060 filed Jul. 10, 1998 and entitled "Digital instant printing camera with image processing capability", the contents of which are specifically incorporated herein by reference.

The type of camera proposed in Ser. No. 09/113,060 is, as indicated, directed at the higher end of the market to compete with existing digital cameras.

We have also proposed, in our co-pending U.S. application Ser. No. 09/113,102 filed Jul. 10, 1998 and entitled "A low cost disposable digital instant printing camera", the contents of which are also specifically incorporated herein by reference, a low cost, one-time use digital camera.

While it is believed that this low-cost camera, on its own, is of considerable commercial value, due to the high quality and instant printing of images which can be obtained, a camera exchange system and method are contemplated so that the camera of our co-pending application Ser. No. 09/113,102 can compete in price with existing disposable, photographic film cameras.

SUMMARY OF THE INVENTION

According to a first aspect of the invention, there is provided a camera exchange system which includes
a plurality of one-time use digital cameras, each camera including an authentication means; and
at least one refurbishing station for refurbishing used, returned cameras by replenishing consumables of each of said returned cameras, the authentication means of each camera authenticating whether or not said at least one refurbishing station is authorised to effect refurbishing of said camera.

Each camera may retail at a price of X currency units, each camera costing approximately Y currency units to manufacture where Y is less than 0.5X. In this specification the term "currency unit" is to be understood as US$1, £1, AU$1, Japanese Yen100, Italian Lire1000, or the like.

The system may include at least one collection depot where a user can return a used one of the cameras for a refund and a plurality of refurbishing stations operated by a manufacturer for receiving the used cameras from said at least one collection depot, each station being able to be authenticated by said used camera, to replenish the consumables of said used camera to enable a refurbished camera to be re-sold at X currency units, and the cost to said manufacture to refurbish the camera being Z currency units. The refund may be approximately 0.25X and Z may be approximately 0.03X.

The consumables which are replenished may include ink, a supply of paper and batteries of the power supply.

Also, at the time that the camera is refurbished, its outer casing may be removed and recycled. All the internal components of the camera are supported on a chassis which may be inserted into a new, recycled casing after replenishing of the consumables and resetting of a picture counter of the camera. A sleeve is placed about the re-cased camera.

A selling price of either one of a new and a refurbished camera by the manufacturer may be approximately 0.5X.

It is envisaged that, for a return for refund rate of approximately 90% of the cameras, a total gross margin as a percentage of sales exceeding 75% is achievable.

To ensure that the low cost cameras compete with disposable photographic film cameras, a cost to the user of each photo processed by the camera may be less than 0.05X if the user returns a used camera for refund.

According to a second aspect of the invention, there is provided a method of exchanging cameras which includes the steps of:
providing a plurality of one-time use digital cameras, each camera containing consumables which are consumed by use of the camera;
receiving returned, used cameras to be refurbished by replenishment of the consumables to provide refurbished cameras; and
authenticating, via each of said returned cameras, that a refurbishing station at which said camera is refurbished is authorised to effect refurbishing of said camera.

The method may include rendering a camera refurbished by an unauthorised refurbishing station inoperative. Further, the method may include carrying out a test routine after refurbishing to determine if the refurbished camera is operative. The test routine for testing a refurbished camera may automatically test that the camera is operative.

The method may include
selling each camera at a retail price of approximately X currency units, each camera costing approximately Y currency units to manufacture where Y is less than 0.5X;
refunding an amount for the return of a used camera; and
refurbishing each returned, used camera at a cost to a refurbisher of Z currency units.

The method may include refunding an amount of approximately 0.25X for the return of a used camera and Z may be approximately 0.03X.

The method may then include supplying refurbished cameras to a retailer at a cost of approximately 0.5X currency units.

BRIEF DESCRIPTION OF THE DRAWINGS

The invention is now described by way of example with reference to the accompanying drawings in which.

DETAILED DESCRIPTION OF THE DRAWINGS

Figure 1:
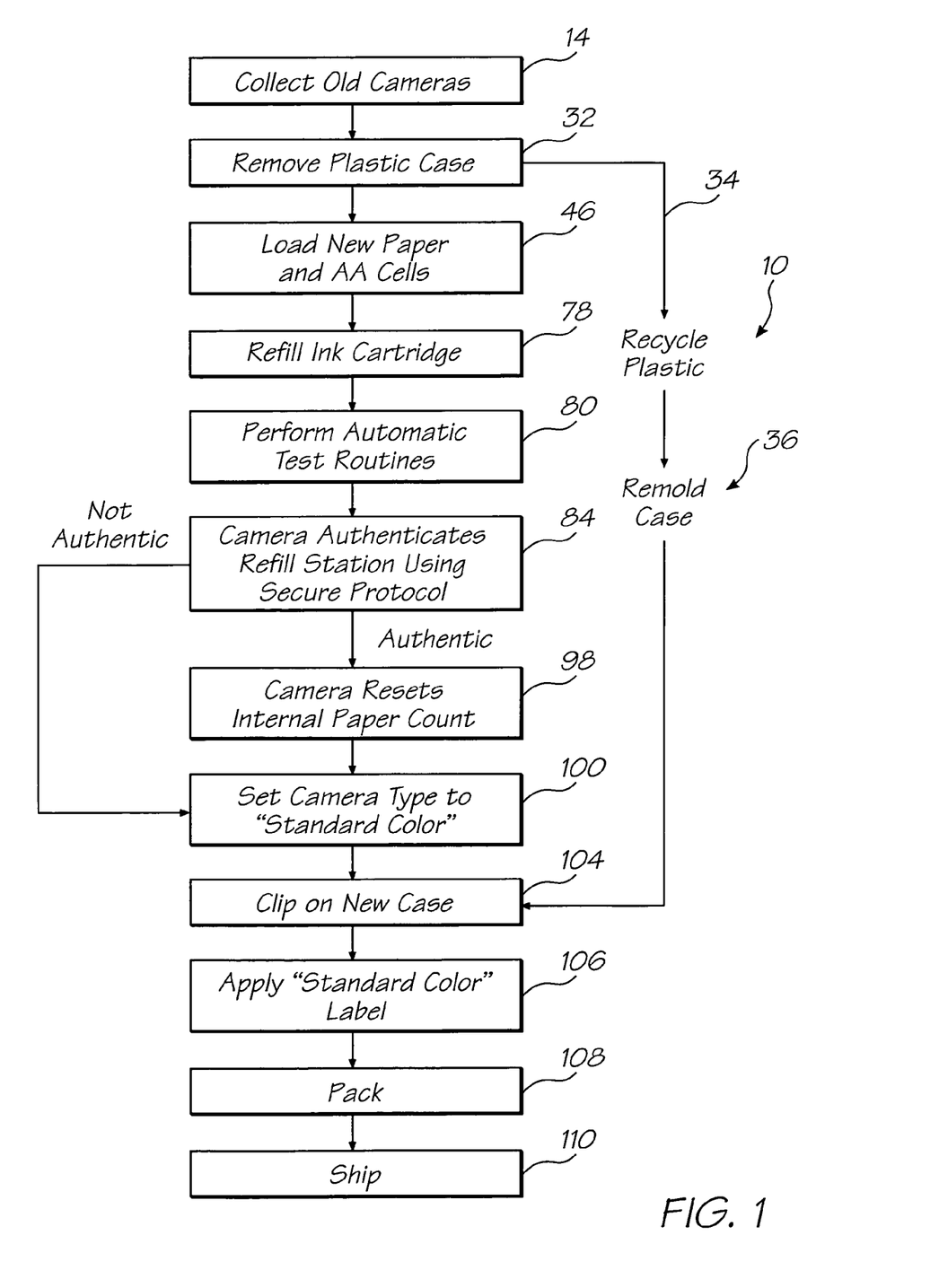
FIG. 1 shows a flow chart of a camera exchange system, and method of exchanging cameras, in accordance with the invention.

Referring initially to FIG. 1 of the drawings, a flow chart of a camera exchange system or a method of exchanging cameras is illustrated and is designated generally by the reference numeral 10. The camera in question is a low cost, recyclable, one-time use, print on demand, digital camera 12 (FIG. 2) and will be described in greater detail below.

In the exchange system, old cameras are collected, as shown at step 14 at collection depots.

By "old cameras" is meant a camera which has been used by a user to take a predetermined number of pictures. As indicated, the camera 12 is a digital, instant printing camera. Typically, the camera 12 has a supply of print media 16 (FIG. 4) for enabling twenty-five pictures to be printed. For ease of reference, and in accordance with conventional camera technology, these pictures will be referred to as exposures.

In accordance with the camera exchange system of the invention, a camera 12, when new has a manufacturing cost of Y currency units. For ease of explanation, the currency unit used in this description will be the US dollar. At present rates, the manufacturing cost of the camera is estimated to be slightly less than $10.00 and, more particularly, in the region of about $9.50. Specifically, a costing analysis reveals that the manufacturing cost of such a camera is in the region of $9.48.

New cameras are supplied to retailers by the manufacturer at a cost of approximately $10.00 so that the return to the manufacturer, in respect of new cameras, will be of the order of about 0.5%.

Also, the camera is retailed by the retailer at a cost of $20.00. When the camera 12 has been used, the old or used camera 12 is returned to the collection depot where a refund of $5.00 is made to the person returning the camera. As a result, the net price to the consumer is $15.00. For a twenty five exposure camera 12, the cost to the consumer for each photo is of the order of $0.60. This equates almost exactly to the present cost of a developed, printed photo taken using a conventional film camera.

Due to the cost of the camera to the consumer, factoring in the refund, and the cost per photo, the consumer, effectively, obtains a digital, instant printing camera at a price similar to that of a disposable, one-time use conventional film camera and the cost of each image or exposure of the digital camera 12 is of the same order as that of the conventional camera.

It will, of course, be appreciated that due to the fact that the camera 12 is a digital camera, it is not necessary for the camera 12 to be returned for processing. Accordingly, an incentive needs to be given for the used cameras 12 to be returned; hence the refund. It is felt that, should adult consumers not bother to return the cameras, it is still likely that children or low income members of the community would return the cameras to obtain the refund.

When the used camera 12 is returned, the camera 12 is refurbished and replenished. The refurbished camera is re-packaged and returned to the retailer.

The approximate cost to the manufacturer of refurbishing a camera 12 is as follows:—

| Refill Part or Process | Cost |
| --- | --- |
| 3.75 meters × 100 mm coated paper | $0.20 |
| Ink (8 ml each CMY) | $0.06 |
| 2 × 1.5V AA cells | $0.20 |
| Recycled molded outer front shell | $0.02 |
| Recycled molded outer back shell | $0.02 |
| Paper camera label | $0.005 |
| Automated retesting | $0.05 |
| Sealed plastic bag | $0.005 |
| Cardboard box | $0.005 |
| Automated packing | $0.005 |
| Manual sorting and handling | $0.05 |
| Transport | $0.05 |
| Total | $0.670 |

The manufacturer supplies such a refurbished camera to the retailer at a similar wholesale cost to a new camera, i.e. US$10.00 so that the gross margin to the manufacturer on refill is of the order of US$9.33.

Further, it is envisaged that, in due course, the ratio of used cameras which are recycled and returned into the market to new cameras will be of the order of 9:1 assuming an estimated camera return-for-refund rate of 90%. Should this figure be obtained, it is estimated that the total gross margin as a percentage of sales which the manufacturer will achieve will be in the order of 77%.

Due to this rate of return, the business model can weather significant retail price pressure and maintain profitability.

An interesting conclusion is that digital printing cameras can be provided having a lower retail price than non-printing digital cameras.

With reference to FIGS. 2 to 8 of the drawings, a brief description of the refurbishing of the camera will be described following the steps of FIG. 1.

Figure 2:
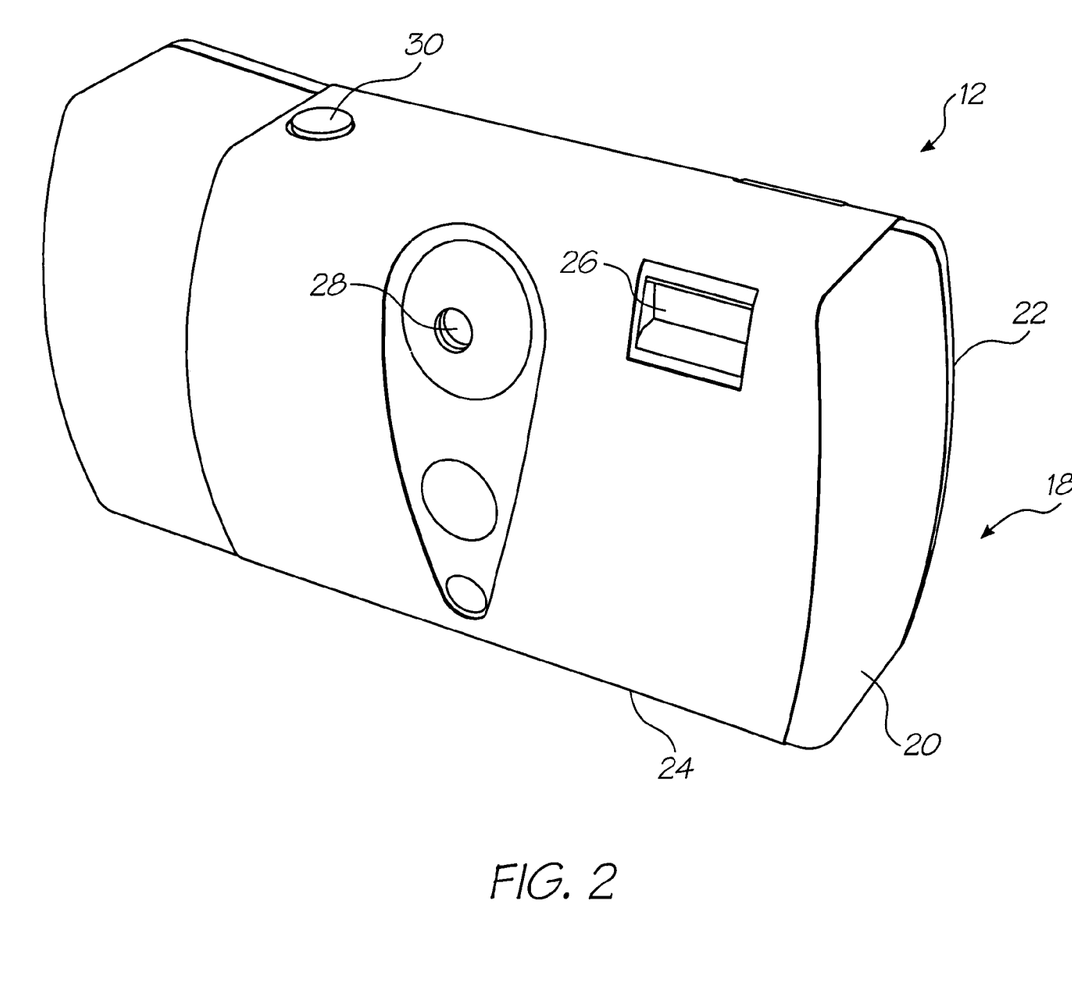
FIG. 2 shows a three dimensional view of the type of camera to be exchanged.

The camera 12 has a casing 18 made up of a front shell 20 and a rear shell or lid 22. The casing 18 has a coated paper sleeve 24 covering a major part thereof. Further, in a conventional fashion, the camera 12 has a viewfinder 26, an imaging lens 28 and an "exposure" taking button 30.

In the recycling of the camera 12, the casing 18 is removed (step 32 in FIG. 1). As illustrated at 34 in FIG. 1, the shells 20 and 22 of the casing 18 are sent for recycling and are remolded, as illustrated at 36 to form new shells 20 and 22 of the casing 18 for another camera.

Once the casing 18 has been removed, a chassis 38 of the camera is exposed. The chassis 38 carries all internal components of the camera. For a more detailed description of these components, reference is made to our co-pending U.S. application Ser. No. 09/113,102 referred to above.

Figure 4:
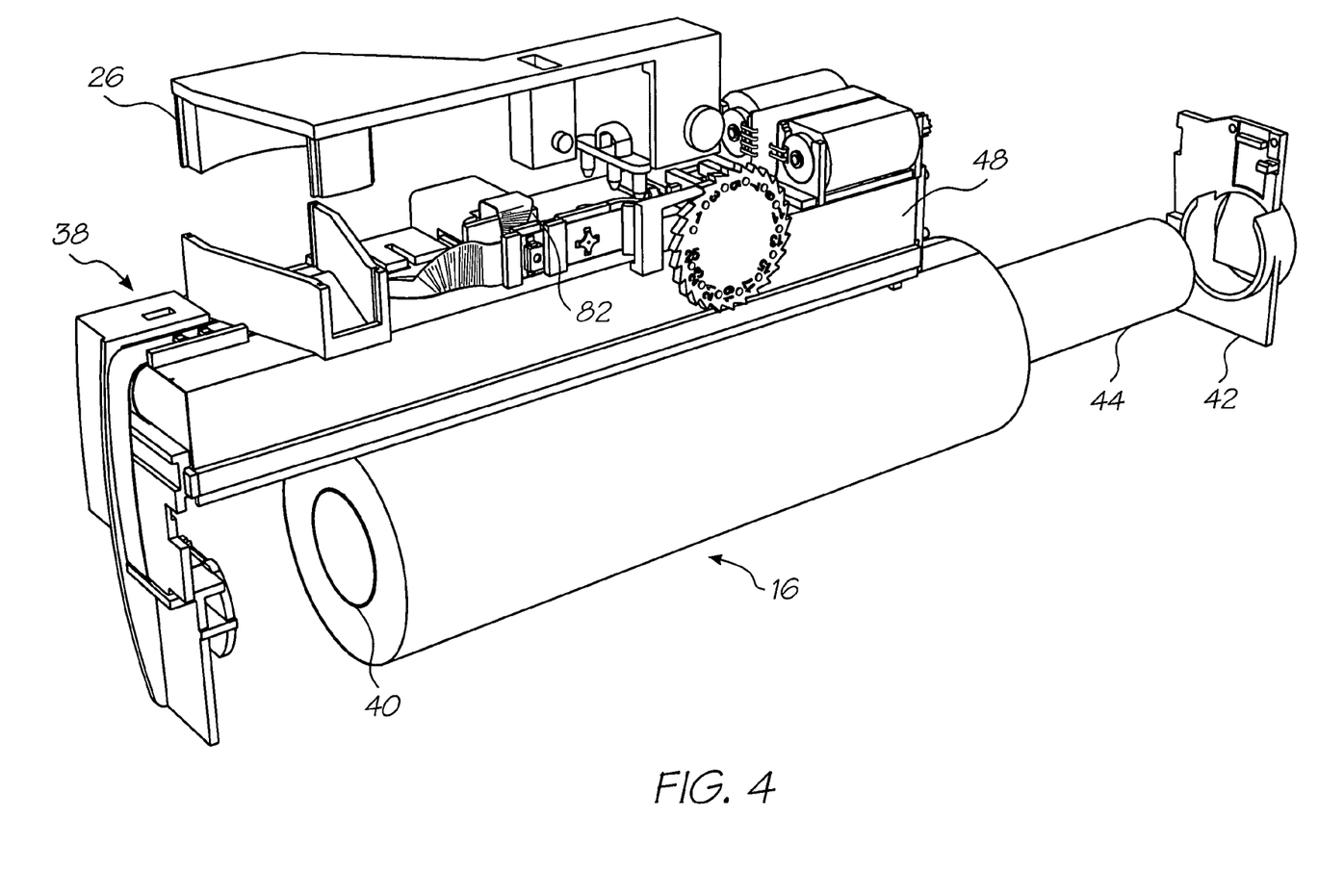
FIG. 4 shows a three dimensional, exploded view of the insertion of a supply of print media and a power supply in the camera during refurbishing thereof.

The supply of print media 16 is in the form of a roll of coated paper carried on a former 40. It will be appreciated that, once the twenty-five exposures have been made, all that will remain in the used camera 12 is the former 40. An end member 42 of the chassis is removed to enable the former 40 to be removed. The former 40 houses batteries 44 for the camera 12 therein to render the camera 12 compact. Accordingly, when the end member 42 of the chassis 38 has been removed, access can be gained to the used batteries 44 which are replaced by fresh batteries.

Hence, once the end member 42 has been removed and the former 40 and batteries 44 of the old camera 12 have been removed, a new print media supply 16 and batteries 44 are loaded on to the chassis 38 and are retained in position by the end member 42. This is shown at step 46 in FIG. 1.

The chassis 38 supports an ink cartridge 48 thereon. An exploded view of the ink cartridge 48 is shown in greater detail in FIG. 3 of the drawings. The ink cartridge has a lower carrier 50 which carries the print head chip 52. The print head chip 52 is a Memjet (Memjet is a trade mark of Silverbrook Research Pty Limited). The print head chip 52 is a photowidth or pagewidth print head and prints one line at a time on print media passing beneath the print head chip 52, in use.

Figure 3:
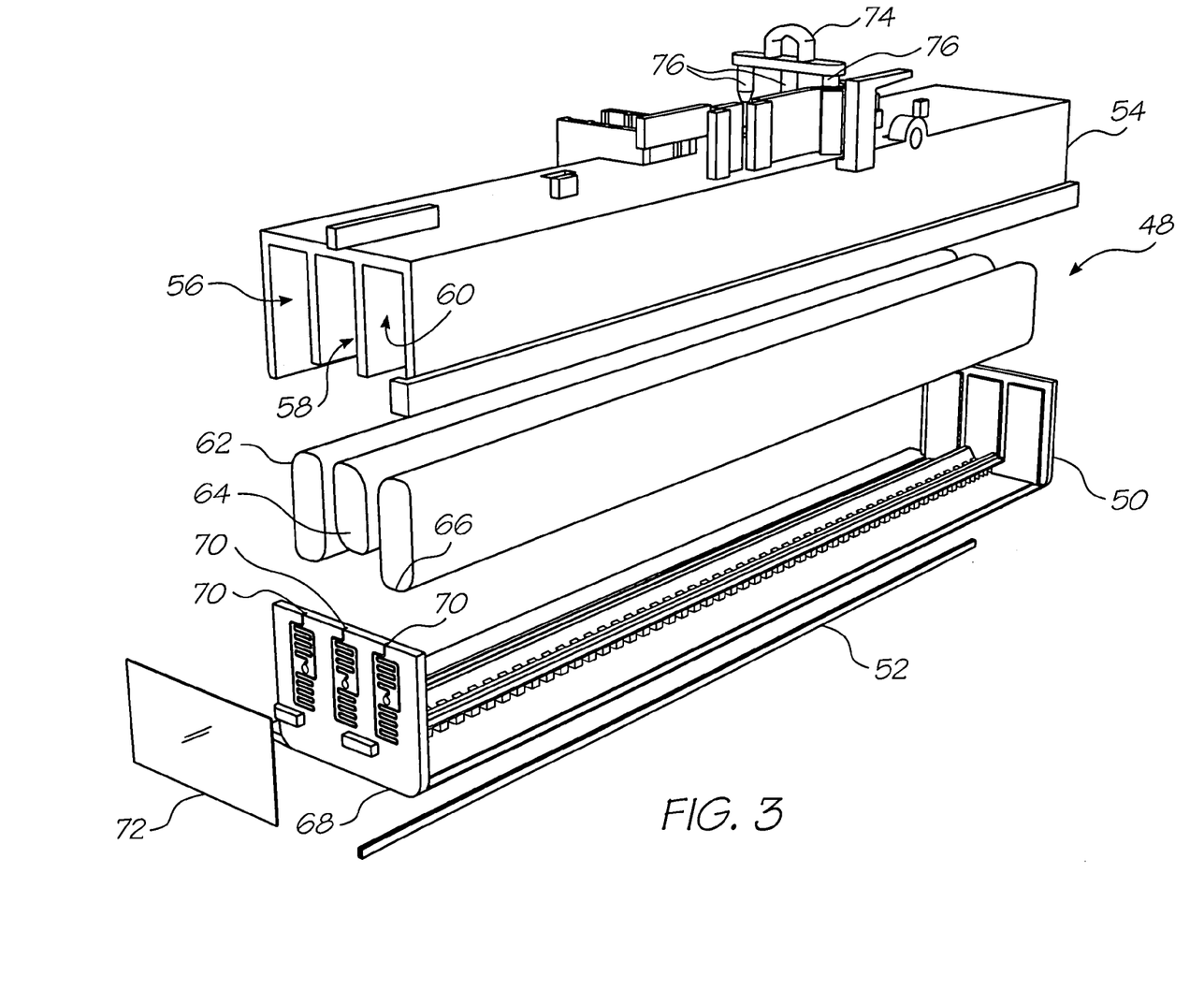
FIG. 3 shows a three dimensional, exploded view of an ink cartridge assembly of the camera of FIG. 2.

The cartridge 48 further includes a cover member 54 which mates with the carrier 50 to define three chambers 56, 58 and 60. Each chamber 56, 58 and 60 carries a different color ink therein so that full color printing can be achieved by the print head chip 52. Each chamber 56, 58 and 60 houses a damping means in the form of a sponge 62, 64 and 66, respectively, therein for damping movement of ink within the chambers 56, 58 and 60.

An end wall 68 of the carrier 50 has labyrinthine openings 70 defined therein. These openings 70 are exposed by removal of a seal 72 when it is desired to refill the chambers 56, 58 and 60. Accordingly, to refill the chambers 56, 58 and 60, a plug 74 is removed. The plug 74 has three prongs 76. Each prong 76 closes off an inlet port to one of the chambers 56, 58 and 60. Accordingly, ink is charged into each of the chambers. For example, cyan ink may be received in the chamber 56, magenta ink may be received in the chamber 58 and yellow ink may be received in the chamber 60. Once the chambers 56, 58 and 60 have been charged with new ink, the plug 74 is replaced and a new seal 72 is applied to cover the openings 70.

The refilling of the ink cartridge is shown at step 78 in FIG. 1 of the drawings. The replenished camera, without the case, is then ready for testing (step 80 in FIG. 1).

Figure 5:
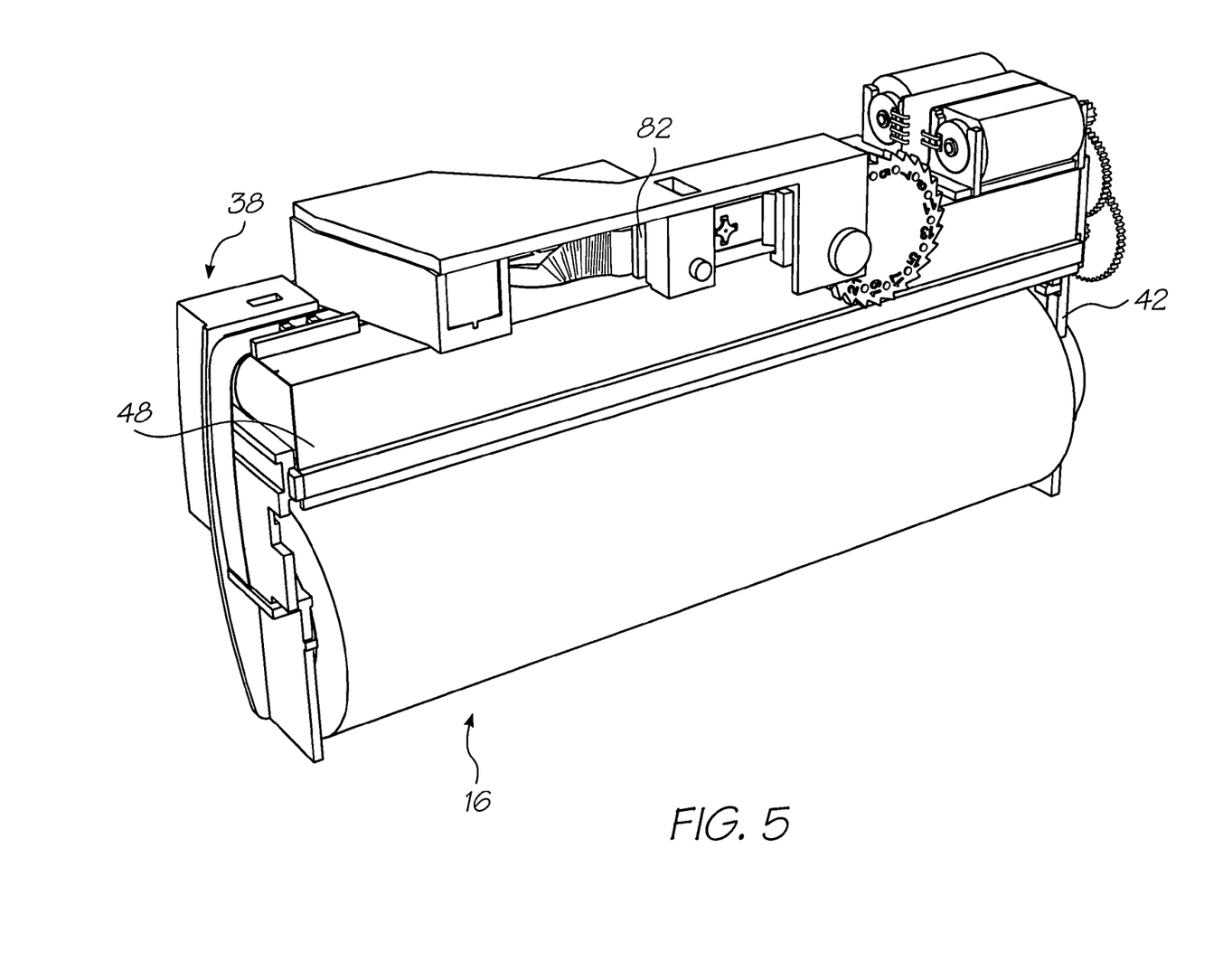
FIG. 5 shows the re-assembly of a chassis of the camera after installation of the supply of print media and power supply.

The caseless camera, as shown in FIG. 5 of the drawings, is then tested by the automatic test routine. In particular, the camera is tested to ensure paper feed and ink flow. Most importantly, the camera is tested to ensure that it has been replenished by an authorised refilling station to ensure that a camera of the required quality is put on to the market. The camera includes an image processing chip 82. Part of the image processing chip 82 has the authentication program contained therein which authenticates that the refurbishing station is authorised (step 84 in FIG. 1). Should the chip 82 determine that the refurbishing station is unauthorised, the chip 82 renders the refurbished camera inoperative.

The part of the image processing chip 82 which includes the authentication program is a flash memory. The flash memory is used to store a 128 bit authentication code. This provides higher security than storage of the authentication code in ROM as reverse engineering can be made essentially impossible. The flash memory is completely covered by third level metal, making the data almost impossible to extract using scanning probe microscopes or electron beams. The authentication code is stored in the chip when manufactured. At least two other flash bits are required for the authentication process: a bit which locks out re-programming of the authentication code and a bit which indicates that the camera has been refilled by an authenticated refill station.

This data are used by a central processing unit of the chip 82 to effect encrypted authentication of the refill station.

The authentication station communicates with the chip 82 via a standard joint test action group (JTAG) interface. This interface also is provided for the testing routine.

To ensure that the cameras are only refilled with quality print media and ink at a properly authorised refill station, the camera 12 authenticates the refill station rather than vice versa. The secure protocol is communicated to the refill station during the automated test procedure via the interface when the new ink is inserted into the cartridge 48.

Authentication

Existing solutions to the problem of authenticating consumables have typically relied on physical patents on packaging. However this does not stop home refill operations or clone manufacture in countries with weak industrial property protection. Consequently a much higher level of protection is required. It is not enough to provide an authentication method that is secret, relying on a home-brew security method that has not been scrutinized by security experts. Security systems such as Netscape's original proprietary system and the GSM Fraud Prevention Network used by cellular phones are examples where design secrecy caused the vulnerability of the security. Both security systems were broken by conventional means that would have been detected if the companies had followed an open design process. The solution is to provide authentication by means that have withstood the scrutiny of experts. A number of protocols that can be used for consumables authentication. We only use security methods that are publicly described, using known behaviors in this new way. For all protocols, the security of the scheme relies on a secret key, not a secret algorithm. All the protocols rely on a time-variant challenge (i.e. the challenge is different each time), where the response depends on the challenge and the secret. The challenge involves a random number so that any observer will not be able to gather useful information about a subsequent identification. Two protocols are presented for each of Presence Only Authentication and Consumable Lifetime Authentication. Although the protocols differ in the number of Authentication Chips required for the authentication process, in all cases the System authenticates the consumable. Certain protocols will work with either one or two chips, while other protocols only work with two chips. Whether one chip or two Authentication Chips are used the System is still responsible for making the authentication decision.

Single Chip Authentication

Figure 9:
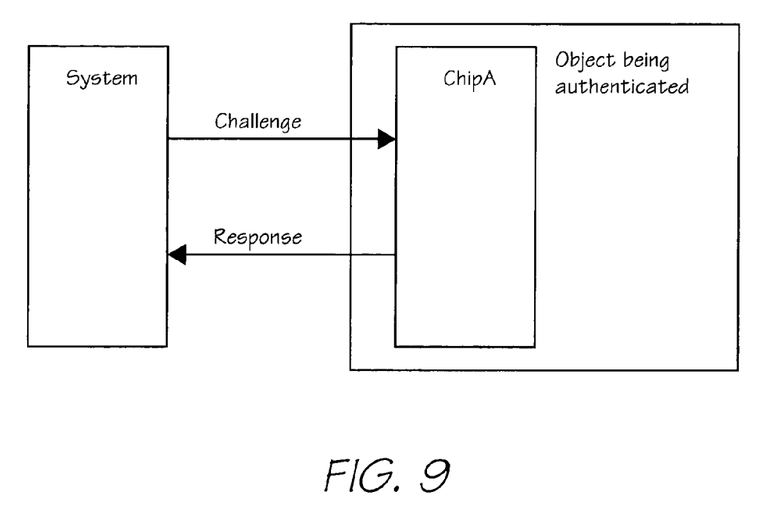
FIG. 9 illustrates a single authentication chip data protocol.

When only one Authentication chip 53 is used for the authentication protocol, a single chip (referred to as ChipA) is responsible for proving to a system (referred to as System) that it is authentic. At the start of the protocol, System is unsure of ChipA's authenticity. System undertakes a challenge-response protocol with ChipA, and thus determines ChipA's authenticity. In all protocols the authenticity of the consumable is directly based on the authenticity of the chip, i.e. if ChipA is considered authentic, then the consumable is considered authentic. The data flow can be seen in FIG. 9. In single chip authentication protocols, System can be software, hardware or a combination of both. It is important to note that System is considered insecure—it can be easily reverse engineered by an attacker, either by examining the ROM or by examining circuitry. System is not specially engineered to be secure in itself.

Double Chip Authentication

Figure 10:
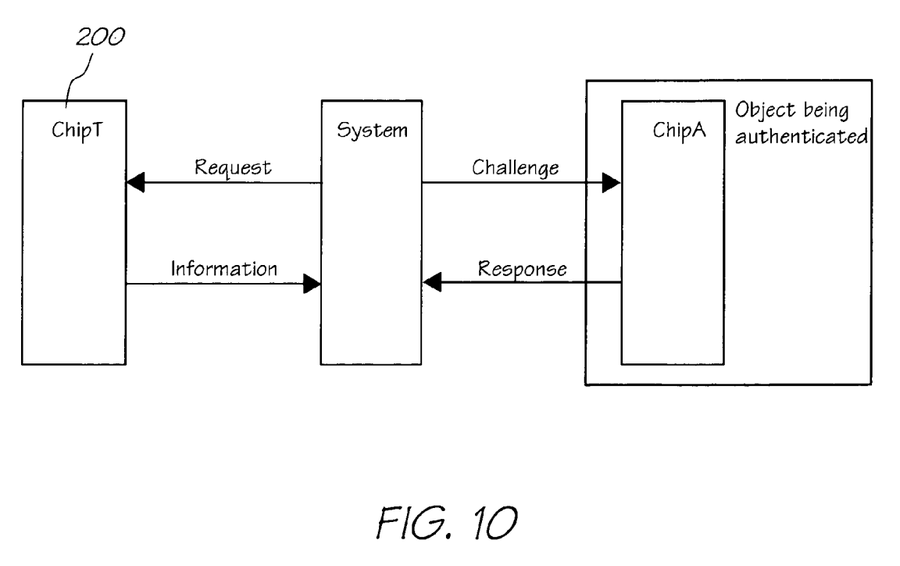
FIG. 10 illustrates a dual authentication chip data protocol.

In other protocols, two Authentication Chips are required as shown in FIG. 10. A single chip (referred to as ChipA) is responsible for proving to a system (referred to as System) that it is authentic. As part of the authentication process, System makes use of a trusted Authentication Chip (referred to as ChipT). In double chip authentication protocols, System can be software, hardware or a combination of both. However ChipT must be a physical Authentication Chip. In some protocols ChipT and ChipA have the same internal structure, while in others ChipT and ChipA have different internal structures.

Presence Only Authentication (Insecure State Data)

For this level of consumable authentication we are only concerned about validating the presence of the Authentication chip 53. Although the Authentication Chip can contain state information, the transmission of that state information would not be considered secure. Two protocols are presented. Protocol 1 requires 2 Authentication Chips, while Protocol 2 can be implemented using either 1 or 2 Authentication Chips.

Protocol 1

Protocol 1 is a double chip protocol (two Authentication Chips are required). Each Authentication Chip contains the following values:

K Key for $F_K[X]$. Must be secret.

R Current random number. Does not have to be secret, but must be seeded with a different initial value for each chip instance. Changes with each invocation of the Random function.

Each Authentication Chip contains the following logical functions:

Random [ ] Returns R, and advances R to next in sequence.

F[X] Returns $F_K[X]$, the result of applying a one-way function F to X based upon the secret key K.

The protocol is as follows:

System requests Random[ ] from ChipT;
ChipT returns R to System;
System requests F[R] from both. ChipT and ChipA;
ChipT returns $F_{KT}[R]$ to System;
ChipA returns $F_{KA}[R]$ to System;
System compares $F_{KT}[R]$ with $F_{KA}[R]$. If they are equal, then ChipA is considered valid. If not, then ChipA is considered invalid.

The data flow can be seen in FIG. 169. The System does not have to comprehend $F_K[R]$ messages. It must merely check that the responses from ChipA and ChipT are the same. The System therefore does not require the key. The security of Protocol 1 lies in two places:

The security of F[X]. Only Authentication chips contain the secret key, so anything that can produce an F[X] from an X that matches the F[X] generated by a trusted Authentication chip 53 (ChipT) must be authentic.

The domain of R generated by all Authentication chips must be large and non-deterministic. If the domain of R generated by all Authentication chips is small, then there is no need for a clone manufacturer to crack the key. Instead, the clone manufacturer could incorporate a ROM in their chip that had a record of all of the responses from a genuine chip to the codes sent by the system. The Random function does not strictly have to be in the Authentication Chip, since System can potentially generate the same random number sequence. However it simplifies the design of System and ensures the security of the random number generator will be the same for all implementations that use the Authentication Chip, reducing possible error in system implementation.

Protocol 1 has several advantages:

K is not revealed during the authentication process

Given X, a clone chip cannot generate $F_K[X]$ without K or access to a real Authentication Chip.

System is easy to design, especially in low cost systems such as ink-jet printers, as no encryption or decryption is required by System itself.

A wide range of keyed one-way functions exists, including symmetric cryptography, random number sequences, and message authentication codes.

One-way functions require fewer gates and are easier to verify than asymmetric algorithms).

Secure key size for a keyed one-way function does not have to be as large as for an asymmetric (public key) algorithm. A minimum of 128 bits can provide appropriate security if F[X] is a symmetric cryptographic function.

However there are problems with this protocol:

It is susceptible to chosen text attack. An attacker can plug the chip into their own system, generate chosen Rs, and observe the output. In order to find the key, an attacker can also search for an R that will generate a specific F[M] since multiple Authentication chips can be tested in parallel.

Depending on the one-way function chosen, key generation can be complicated. The method of selecting a good key depends on the algorithm being used. Certain keys are weak for a given algorithm.

The choice of the keyed one-way functions itself is non-trivial. Some require licensing due to patent protection.

A man-in-the middle could take action on a plaintext message M before passing it on to ChipA—it would be preferable if the man-in-the-middle did not see M until after ChipA had seen it. It would be even more preferable if a man-in-the-middle didn't see M at all. If F is symmetric encryption, because of the key size needed for adequate security, the chips could not be exported from the USA since they could be used as strong encryption devices. If Protocol 1 is implemented with F as an asymmetric encryption algorithm, there is no advantage over the symmetric case—the keys needs to be longer and the encryption algorithm is more expensive in silicon. Protocol 1 must be implemented with 2 Authentication Chips in order to keep the key secure. This means that each System requires an Authentication Chip and each consumable requires an Authentication Chip.

Figure 6:
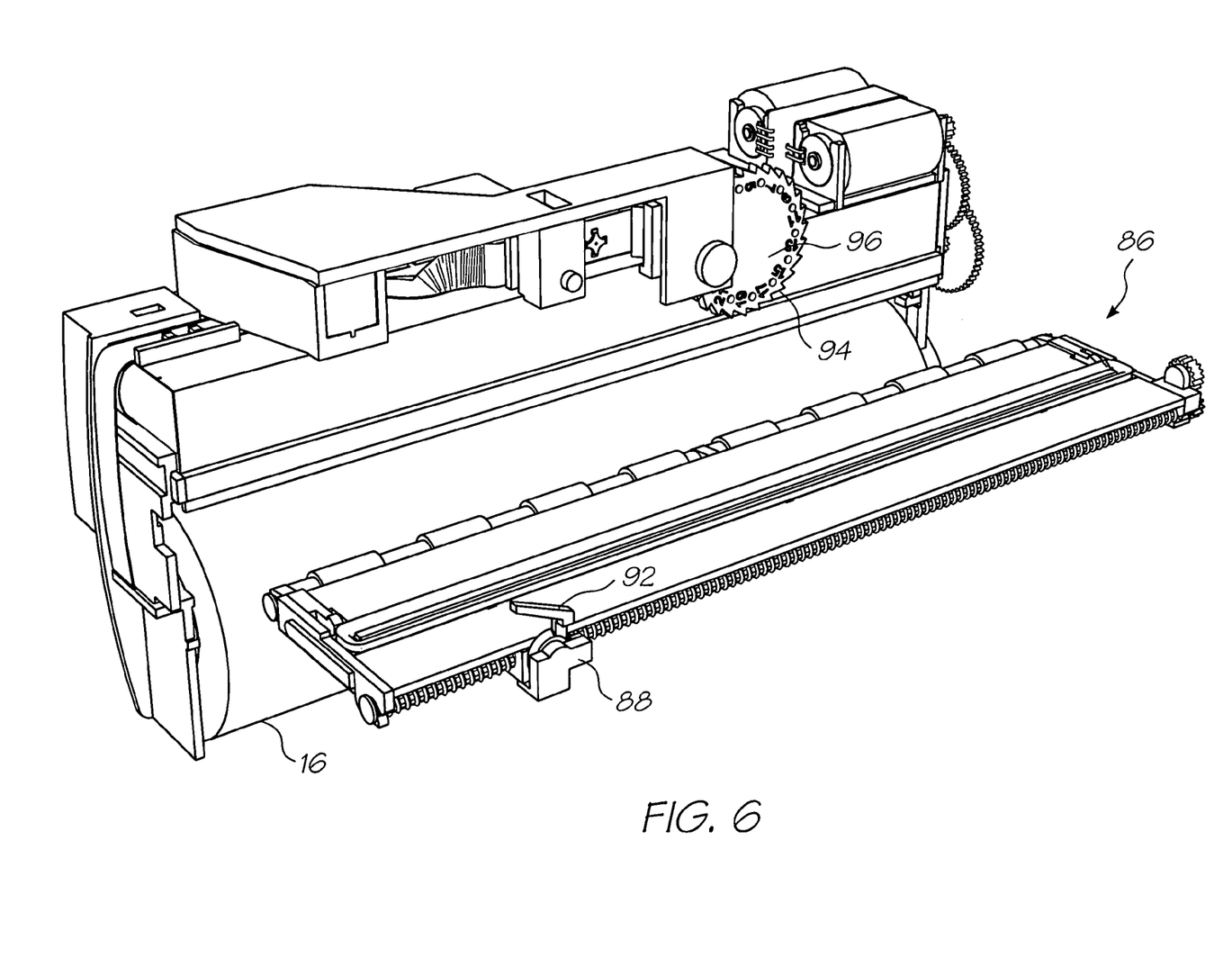
FIG. 6 shows a three dimensional view of the insertion of a platen forming part of the camera.
Figure 7:
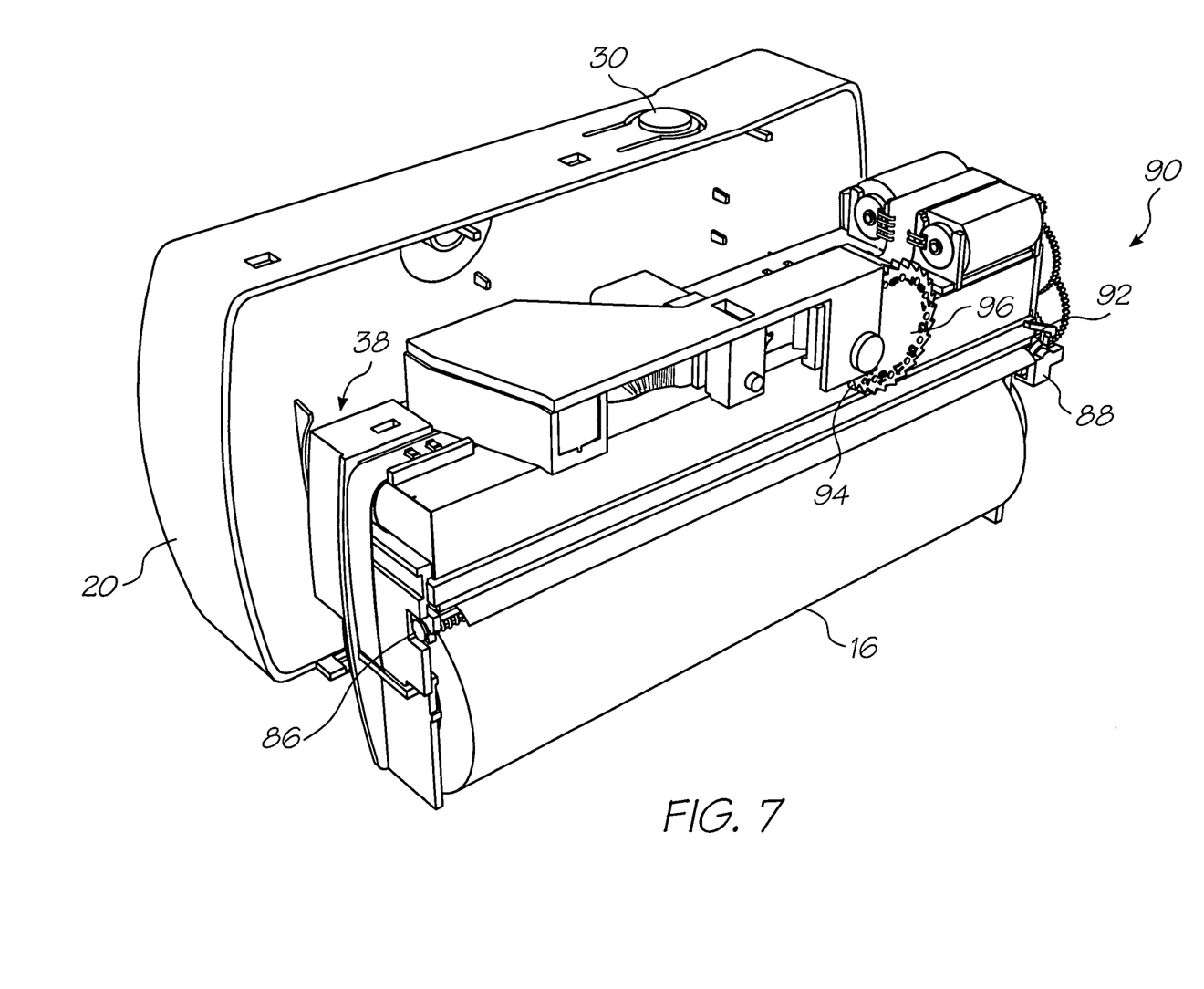
FIG. 7 shows the installation of the re-assembled chassis in a front shell of a casing of the camera.
Figure 8:
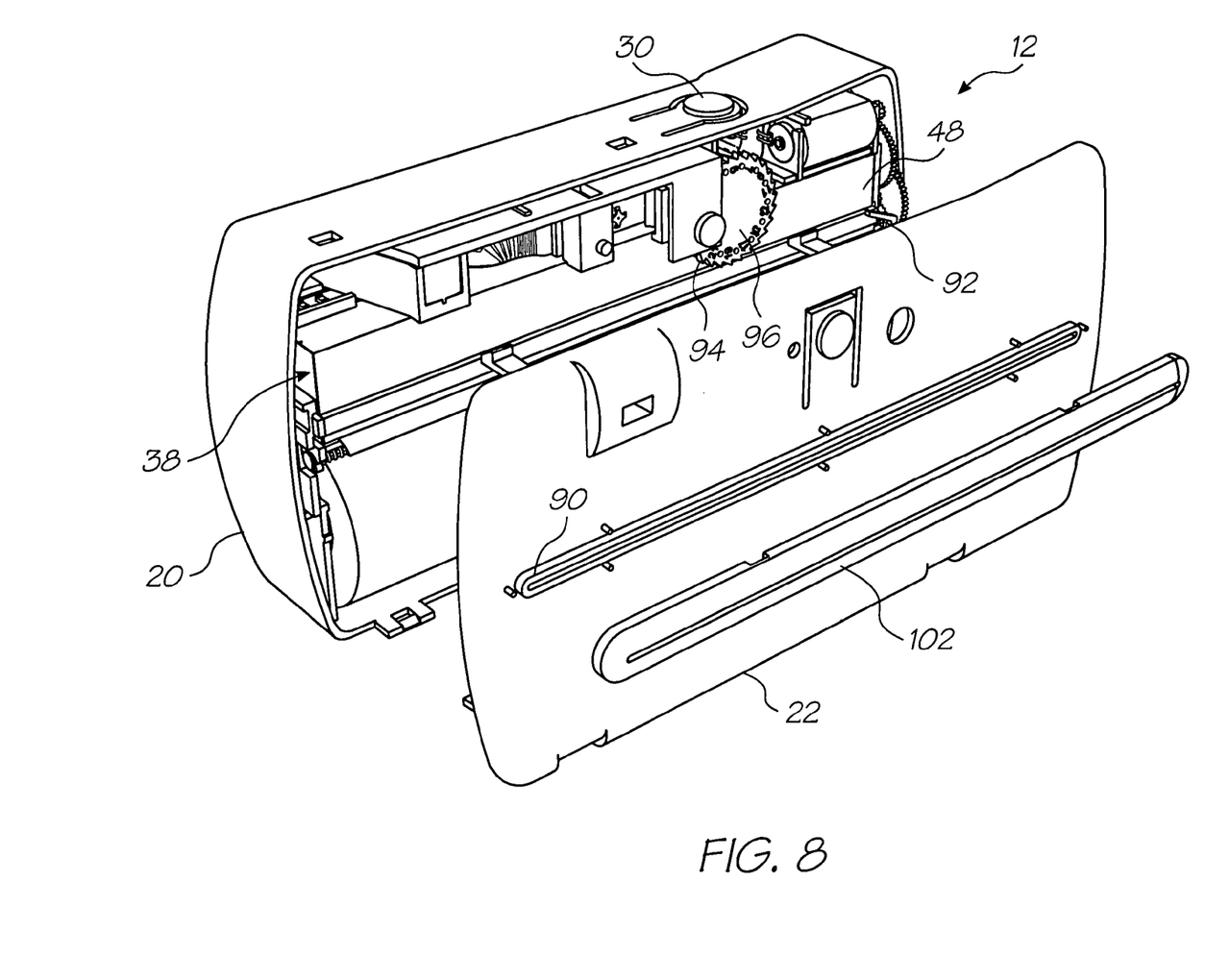
FIG. 8 shows the mounting of a rear shell of the casing on to the front shell.

Paper, from the supply 16, is wound about a platten 86 (FIG. 6). In normal use, the platten 86 has a paper cutting mechanism 88 thereon which, once an image has been printed on the paper and the paper has been fed out of an ejection slot 90 (FIG. 8) of the rear cover or shell 22 of the casing 18, cuts that piece from the remainder of the supply 16. The cutting mechanism 18 includes a pawl 92 which engages ratchet-like teeth 94 of an exposure counter 96 during the cutting operation to advance the counter by one.

Should the chip 82 determine that the refurbishing station is an authorised station, the counter 96 is reset as shown at step 98 in FIG. 1 of the drawings.

Due to the digital processing of images sensed by the image sensor 28 of the camera 12, it is possible for special effects to be imparted to those images. Accordingly, special types of cameras may be made available, such as for the production of sepia colored photographs, multiple passport type photographs, photographs relating to special events such as weddings, special sporting events, or the like. This modification of the standard image is effected by the image processing chip 82. Such special types of cameras are identifiable as such by means of an appropriately marked sleeve 24. When, however, the cameras are refurbished, the image processing chip 82 is reset to a standard type as shown at step 100 by the refurbishing station.

The refurbishing and replenishing of the camera is then completed and the final step involves the insertion of the new chassis 38, with its components, into a new front cover 20 of the casing 12 and the attachment of a rear cover or lid 22. The lid 22 clips to the front cover 20 and is also bonded thereto so that should an attempt be made to open the casing 18, this will result in the destruction of the casing 18.

A new sleeve 24 is applied to the casing 18. The sleeve 24 is held in position by a slot surround 102.

The steps of attaching a new case 18 and applying the label or sleeve 24 are shown at 104 and 106, respectively, in FIG. 1 of the drawings.

The refurbished camera 12 is packed (step 108 in FIG. 1) and shipped (step 110 in FIG. 1) to retailers.

Accordingly, a camera exchange system and method of exchanging cameras are provided which enables instant printing, digital cameras to compete with conventional film, one-time use cameras both in so far as costs of the cameras and costs of each exposure are concerned. Further, by authenticating the refilling station, quality control can be maintained to ensure that the quality of exposures obtained by consumers is of a satisfactory quality.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A camera exchange system which includes
a plurality of one-time use, digital cameras, each camera including:
a supply of print media;
a printer for printing an image onto said print media;
a cutter for severing a printed image from said supply of print media;
a counter for counting the number of cutting operations of said cutter;
an authentication means;
the system further including:
at least one refurbishing station for refurbishing used, returned cameras by replenishing at least said supply of print media of each of said returned cameras and by resetting said counter, the authentication means of each camera authenticating whether or not said at least one refurbishing station is authorised to effect refurbishing of said camera.

2. The system of claim 1 in which each camera retails at a price of X currency, each camera costing approximately Y currency units to manufacture, where Y is less than 0.5X.

3. The system of claim 2 which includes
at least one collection depot where a user can return a used one of the cameras for a refund; and
a plurality of refurbishing stations operated by a manufacturer for receiving the used cameras from said at least one collection depot, each station being able to be authenticated by said used camera, to replenish the print roll of said used camera to enable a refurbished camera to be re-sold at X currency units, and the cost to said manufacturer to refurbish the camera being Z currency units.

4. The system of claim 3 in which the refund is approximately 0.25X.

5. The system of claim 3 in which Z is approximately 0.03X.

6. The system of claim 1 in which a selling price of either one of a new and a refurbished camera by the manufacturer is approximately 0.5X.

7. The system of claim 1 in which, for a return for refund rate of approximately 90% of the cameras, a total gross margin as a percentage of sales exceeding 75% is achieved.

8. The system of claim 1 in which a cost to the user of each photo processed by the camera is less than 0.05X if the user returns a used camera for refund.

9. A method of exchanging cameras which includes the steps of:
providing a plurality of one-time, use digital cameras, each camera including:
a supply of print media consumed by use of the camera,
a printer for printing an image onto said print media,
a cutter for severing a printed image from said supply of print media,
a counter for counting the number of cutting operations of said cutter;
receiving returned, used cameras to be refurbished at least by replenishment of the print media and by resetting of the counter to provide refurbished cameras; and
authenticating, via each of said returned cameras, that a refurbishing station at which said camera is refurbished is authorised to effect refurbishing of said camera.

10. The method of claim 9 which includes rendering a camera refurbished by an unauthorised refurbishing station inoperative.

11. The method of claim 10 which includes carrying out a test routine after refurbishing to determine if the refurbished camera is operative.

12. The method of claim 9 which includes
selling each camera at a retail price of approximately X currency units, each camera costing approximately Y currency units to manufacture where Y is less than 0.5X;
refunding an amount for the return of a used camera; and
refurbishing each returned, used camera at a cost to a refurbisher of Z currency units.

13. The method of claim 12 which includes refunding an amount of approximately 0.25X for the return of a used camera.

14. The method of claim 12 in which Z is approximately 0.03X.

15. The method of claim 12 which includes supplying refurbished cameras to a retailer at a cost of approximately 0.5X currency units.

* * * * *